3,632,739
SOLID SUSTAINED RELEASE PHARMACEUTICAL PREPARATION

Saul S. Kornblum, Springfield, N.J., assignor to Sandoz-Wander, Inc., Hanover, N.J.
No Drawing. Filed Dec. 29, 1969, Ser. No. 888,987
Int. Cl. A61k 27/12
U.S. Cl. 424—19     4 Claims

ABSTRACT OF THE DISCLOSURE

A sustained release pharmaceutical tablet, prepared by dissolving the medicament and a retardant agent in a solvent, forming a slurry of the solution and a carrier, spray drying the slurry and tabletting the resultant free flowing powder.

---

This invention rielates to solid form sustained release pharmaceutical preparations. More particularly it relates to sustained release pharmaceutical tablets and to a process for their preparation.

Sustained release forms of medication are known to the art. They provide for prolonged action of a medicament in the gastro-intestinal tract by slow release over an extended period of time. Sustained release medicaments have been prepared in tablet form and basically contain a drug or combination of drugs, a water-insoluble retardant agent and various diluents.

Most prior art sustained release tablets have been prepared by granulating the medicament, the water-insoluble retardant agent and the diluents with a solvent until granular aggregates form, screening the wet mass, drying it, and then tabletting.

Tablets formed in this prior art manner have been deficient in that they require large amount of the water retardant agent to maintain a tablet which will not disintegrate when exposed to gastric or intestinal fluids. This excess of retardant prevents the release of pharmaceutically desirable amounts of the drug in the early stages of medication. Reduction of the amount of water-retardant agent, however, has caused rapid disintegration of the tablets of the prior art thus eliminating the sustained release function of this dosage form.

It is therefore an object of this invention to prepare solid form sustained release pharmaceutical preparations, containing reduced amounts of water-retardant agent which eliminates the undesirable features of the prior art type preparations.

Broadly, this invention contemplates solid form sustained release medicaments which are prepared by
(a) Dissolving the desired medicament and a suitable water-insoluble retardant agent in a suitable solvent,
(b) Forming a slurry of the medicament-retardant solution and a water insoluble carrier,
(c) Spray-drying the slurry to form a free flowing powder, and
(d) Tabletting the spray-dried powder.

Any medicament which may be utilized in sustained release form is included within the scope of this invention. For example medicaments such as sympathomimetic agents, antispasmodic agents, antihistamine agents, anorectic agents and the like may be utilized.

The water-insoluble retardant agent is resistant to disintegration in the gastro-intestinal tract and provides for a gradual release of the medicament in said tract. Among the water-insoluble retardant agents which may be used either singularly or in combination are, pharmaceutically acceptable, ethylcellulose, methylcellulose, polyvinylchloride, fatty acids, polyvinylalcohols, hydroxypropylcellulose, fatty alcohols, shellac, vinylacetate resins and the like. The amount of the water insoluble retardant agent used is from 2.5 to 7.0% w./w. preferably 2.5–5.5% w./w. of the spray-dried powder. This has been found to give a pharmaceutically acceptable sustained release of the drug for periods in excess of five hours, without appreciable disintegration of the tablet.

Water-insoluble carriers such as calcium sulfate and dicalcium phosphate may be used in the practice of this invention. They must however be non-toxic and inert to the other ingredients of the preparation and insoluble in the solvent system used for the drug and water-insoluble retardant. They provide a nucleus or center, upon which the drug and retardant agent may be carried, so as to form a tablet of acceptable size and weight. The solvent used must be a solvent for both the drug and the water retardant agent, so that upon evaporation during spray-drying the carrier surface will be coated with the drug and water retardant agent.

By using the process of this invention, sustained release tablets can be prepared which have both a pharmaceutically acceptable first hour release rate of 40–45%, and a high resistance to disintegration (5 or more hours) in the gastro-intestinal tract. This is achieved with a substantial and unobvious reduction in the amount of retardant agent necessary to achieve the sustained release action by prior art methods.

The spray drying utilized in this invention may be carried out in apparatus conventionally used for spray drying and which is well known in the art.

Tablets can be prepared using the spray-dried particles, by conventional tabletting techniques. It is preferred to use up to 5.0 mg. per 250 mg. tablet of a lubricating agent such as magnesium stearate when preparing the tablets.

This invention is further illustrated but not limited by the following specific example.

EXAMPLE

Sustained release medicaments containing the following composition of ingredients were prepared, following the process of this invention.

| Formulation A: | Percent |
|---|---|
| Isobutylallylbarbituric acid | 24.0 |
| Ethylcellulose, low viscosity | 4.5 |
| Methylcellulose 60 HG, 50 cps. | 1.0 |
| Calcium sulfate dihydrate | 65.6 |
| Alginic acid | 4.9 |

Tablets were prepared from Formulation A containing per tablet:

| | |
|---|---|
| Isobutylallylbarbituric acid spray-dried powder | 250.0 |
| Magnesium stearate | 5.0 |

The procedure for preparing Formulation A is as follows:

The isobutylallylbarbituric acid and ethylcellulose, low viscosity, were placed in a stainless steel vessel containing 1,000 ml. of special denatured alcohol (90% ethanol; 10% methanol). A propeller-type mixer was employed to stir until the solids were dissolved. Gentle heat may be employed. In another vessel, 200 ml. of purified water was heated to boiling and the methylcellulose 60 HG, 50 cps., slowly added to the vortex formed by the propeller mixer until the synthetic gum was completely dispersed. The hydrated methylcellulose was then slowly added to the alcoholic solution. Finally, the calcium sulfate dihydrate and alginic acid were added and mixed until a uniform smooth slurry was obtained.

A portable laboratory spray dryer equipped with a centrifugal atomizing wheel functioning from air turbine drive with a velocity of about 40,000 r.p.m. was used. The heated chamber of the spray dryer was maintained at 150–160° and the outlet temperature at 90–100°. The slurry was introduced to the atomizing wheel using a pump which maintained the flow at the rate of 45 g./min. A cyclone collector was used to separate the spray-dried powder from the solvent.

The spray-dried powder was blended with the magnesium stearate and compressed into tablets using a single-station machine (Stokes E Tablet Press) employing 8-mm. flat, bevel-edge punches.

Sustained release medicaments containing the following composition of ingredients were prepared, following the prior art process:

|  | Formulation, percent w./w. | | |
|---|---|---|---|
|  | B | C | D |
| Isobutylallylbarbituric acid | 24.0 | 24.0 | 24.0 |
| Ethylcellulose, low viscosity | 4.5 | 9.0 | 13.5 |
| Methylcellulose 60 HG, 50 cps | 1.0 | 1.0 | 1.0 |
| Calcium sulfate dihydrate | 65.6 | 61.1 | 56.6 |
| Alginic acid | 4.9 | 4.9 | 4.9 |

Tablets were prepared from Formulations B, C and D containing per tablet;

Mg./tablet
Isobutylallylbarbituric acid spray-dried powder __ 250.0
Magnesium stearate _____ 5.0

The procedure for preparing Formulations B, C and D is as follows:

All the ingredients were placed in a stainless steel vessel and a hydroalcoholic solution (1:5 ratio, respectively) was added with mixing to form a wet mass of granular consistency. The wet mass was then screened through a #8 mesh screen, dried and broken through a #14 mesh screen. The dried granules were then blended with the magnesium stearate.

Tablets were prepared from the resulting lubricated granules as described in Formulation A.

The tablets prepared from Formulations A, B, C and D were tested for disintegration rate using the "Tablet Disintegration Test" and apparatus, USP XVII p. 919. The USP test was modified in that the plastic disc was not used. Basically the test procedure is to place USP simulated gastric fluid (0.1 N HCl) in a glass tube (basket) containing a 10 mesh screen at the bottom. The test tablet is then placed in the tube and the tube mounted on a rack. The rack is set into vertical motion so as to move the tablet through the gastric fluid. Disintegration of the tablet is determined when all of the tablet particles have passed through the screen at the bottom of the tube.

Sustainer release tablets must remain intact during the prescribed release period in order to provide the slow release of the desired drug. A 5-hour period of exposure to the disintegration test was therefore used as a first test to determine suitable sustained release formulations. Those formulations which remained intact during the disintegration test were then tested for dissolution rates of the drug.

Cumulative release of isobutylallylbarbituric acid tablets under in vitro conditions was tested using the rotating bottle method, NF XII Second Supplement p. 15 "Timed-Release Tablets and Capsules—In Vitro Test Procedure."

Basically this dissolution test is run as follows:

(1) The tablets are rotated at 40±2 r.p.m. and 37° C. in a bottle containing 50 ml. of simulated gastric fluid (0.1 N HCl).

(2) Aliquots are taken from the bottle at hourly intervals and analyzed for percent drug released.

(3) The simulated gastric and intestinal fluids composition are altered at the hourly intervals.

The first and second hours utilize all simulated gastric fluid. The third hour is ½ simulated gastric fluid and ½ simulated intestinal fluid, and the fourth hour is ¼ simulated gastric fluid and ¾ simulated intestinal fluid. The results of the cumulative release test is shown in Table I.

TABLE I.—PERCENT BY WEIGHT OF CUMULATIVE RELEASE OF ISOBUTYLALLYLBARBITURIC ACID, HR.

| Formulation | 1 | 2 | 3 | 4 |
|---|---|---|---|---|
| A | 40.6–44.6 | 61.8–67.1 | 67.6–73.0 | 73.5–80.4 |
| B | Disintegration after 37 minutes | | | |
| C | Disintegration after 76 minutes | | | |
| D | 9.1–9.4 | | | |

Tablets of Formulations A and D were intact after 5 hours in simulated gastric fluid in the USP disintegration apparatus.

Tablets of Formulation B disintegrated completely after 37 minutes, those of Formulation C disintegrated completely in 76 minutes.

It has been unexpectedly found that following the process of this invention sustained release tablets (Formulation A), can be prepared which have a desirable release rate of from about 40 to 45% during the first hour, and are intact after prolonged (e.g., greater than 4 hours) exposure in simulated gastric and intestinal fluids. This is in contrast to tablets (Formulation D) prepared following prior art practice with threefold increase in ethylcellulose wherein an undesirable therapeutic release rate of only about 9–10% was achieved during the first hour. Attempts to increase the first hour release rate of these prior art tablets (Formulations B and C) resulted in undesirable disintegrations of the tablets within about 40 to 80 minutes.

Following the procedure for preparing Formulation A, but decreasing the amount of ethylcellulose to 2.5% (Formulation E) and then increasing the ethylcellulose to 5.5% (Formulation F), tablets were prepared while remained intact after 5 hours in simulated gastric fluid in the USP disintegration test. Formulations E and F were also tested for sustainer release rate of the drug using the NF rotating bottle test. The results are shown in Table II.

TABLE II.—PERCENT BY WEIGHT OF CUMULATIVE RELEASE OF ISOBUTYLALLYLBARBITURIC ACID, HR.

| Formulation | 1 | 2 | 3 |
|---|---|---|---|
| E | 76 | 20 | |
| F | 28 | 20 | 10 |

Table II shows that variations in acceptable sustained release patterns are possible with only minimal variations of the water-insoluble retardant.

The process of this invention, therefore, in contrast to the prior art, provides sustained release formulations which have excellent resistance to disintegration and a highly desirable drug release rate.

In addition, the process provides excellent distribution of the drug throughout the spray-dried powder and good reproducibility of the release pattern for consecutive batches of tablets of the same composition, which makes this novel process pharmaceutically important.

It is known that the greater amount of the water-insoluble retardant agent contained in sustained release tablets, the greater is the likelihood of physical change with shelf-life, i.e., hardness, crystalline structure and release pattern. The tablets prepared by spray-dried process of this invention were not significantly altered by prolonged storage under normal conditions.

What is claimed is:

1. In a spray drying process for preparing a solid sustained release medicinal preparation with ethylcellulose, the improvement which comprises the steps of dissolving an intimate mixture of solid alcoholic soluble medicament and low viscosity ethylcellulose as a non-toxic water-insoluble retardant agent in a hydroalcoholic solvent, adding hydrated methylcellulose that has been completely dispersed in boiling water to the alcoholic solution, forming a slurry of said medicament-retardant solution with a non-toxic water insoluble finely divided solid particulate carrier of calcium sulfate dihydrate and alginic acid, spray drying said slurry and separating the solvent to form a free flowing powder, said ehtylcellulose being present in an amount of from 2.5-7.0% by weight of the spray dried powder, said methylcellulose being present at about 1% by weight of the spray dried powder, and said alginic acid being present at about 5% by weight of the spray dried powder.

2. In a spray drying process for preparing a solid sustained release medicinal preparation with ethylcellulose, the improvement which comprises the steps of dissolving an intimate mixture of solid alcoholic soluble medicament and low viscosity ethylcellulose as a non-toxic water-insoluble retardant agent in a hydroalcoholic solvent, adding hydrated methylcellulose that has been completely dispersed in boiling water to the alcoholic solution, forming a slurry of said medicament-retardant solution with a non-toxic water insoluble finely divided solid particulate carrier of calcium sulfate dihydrate and alginic acid, spray drying said slurry and separating the solvent to form a free flowing powder, to form a free flowing powder, mixing with a tabletting lubricant and tabletting said free flowing powder, said ethylcellulose being present in an amount of from 2.5-7.0% by weight of the spray dried powder, said methylcellulose being present at about 1% by weight of the spray dried powder, and said alginic acid being present at about 5% by weight of the spray dried powder.

3. The sustained release medicinal powder product prepared by the process of claim 1.

4. The sustained release medicinal tablet product prepared by the process of claim 2, said product having a medicament release rate of from 40-45% during the first hour in gastric or intestinal fluids and remaining intact after prolonged exposure in said fluids.

References Cited

UNITED STATES PATENTS

| | | | |
|---|---|---|---|
| 2,798,838 | 7/1957 | Robinson | 424—35 X |
| 2,805,977 | 9/1957 | Robinson et al. | 424—19 |
| 2,887,440 | 5/1959 | Greminger et al. | 424—362 X |
| 3,065,143 | 11/1962 | Christenson et al. | 424—19 |
| 3,079,303 | 2/1963 | Raff et al. | 424—35 X |
| 3,146,167 | 8/1964 | Lantz et al. | 424—22 X |
| 3,256,111 | 6/1966 | Singiser | 117—85 |
| 3,266,992 | 8/1966 | deJong | 424—35 X |
| 3,293,132 | 12/1966 | Stoylb et al. | 424—280 X |
| 3,371,015 | 2/1968 | Sjogren et al. | 424—35 X |
| 3,383,236 | 5/1968 | Brindamour | 117—100 |

SHEP K. ROSE, Primary Examiner

U.S. Cl. X.R.

424—20, 22, 35, 362